United States Patent
Sherer

(10) Patent No.: US 9,446,827 B2
(45) Date of Patent: *Sep. 20, 2016

(54) BOAT HULL CONSTRUCTION

(71) Applicant: Myron Sherer, Grosse Pointe Farms, MI (US)

(72) Inventor: Myron Sherer, Grosse Pointe Farms, MI (US)

(*) Notice: Subject to any disclaimer, the term of this patent is extended or adjusted under 35 U.S.C. 154(b) by 4 days.

This patent is subject to a terminal disclaimer.

(21) Appl. No.: 14/457,905

(22) Filed: Aug. 12, 2014

(65) Prior Publication Data

US 2015/0064997 A1 Mar. 5, 2015

Related U.S. Application Data

(63) Continuation-in-part of application No. 13/183,888, filed on Jul. 15, 2011, now Pat. No. 8,800,463.

(60) Provisional application No. 61/364,799, filed on Jul. 15, 2010.

(51) Int. Cl.
| | |
|---|---|
| *B63B 1/32* | (2006.01) |
| *B63H 5/14* | (2006.01) |
| *B63H 5/16* | (2006.01) |

(52) U.S. Cl.
CPC ........... *B63H 5/14* (2013.01); *B63H 5/16* (2013.01); *B63B 2001/325* (2013.01); *Y02T 70/12* (2013.01)

(58) Field of Classification Search
CPC ........... B63H 5/14; B63H 5/16; B63B 1/32; B63B 1/042; B63B 2001/045; B63B 2001/32
USPC ............ 114/288, 289, 290, 61.2, 61.32, 62; 440/66–70
See application file for complete search history.

(56) References Cited

U.S. PATENT DOCUMENTS

| | | | |
|---|---|---|---|
| 1,059,806 A | 4/1913 | Yarrow | |
| 1,505,832 A | 8/1924 | Weisz | |
| 3,793,980 A * | 2/1974 | Sherman | B63H 5/16 440/69 |
| 4,288,223 A | 9/1981 | Gonzalez et al. | |
| 4,300,889 A | 11/1981 | Wormser | |
| 4,622,016 A | 11/1986 | Hankley | |
| 4,637,801 A | 1/1987 | Schultz | |
| 4,666,411 A | 5/1987 | Silvester | |
| 4,804,312 A | 2/1989 | Schneekluth | |
| RE33,165 E | 2/1990 | Whitehead | |
| 4,907,520 A | 3/1990 | Pipkorn | |
| 4,932,908 A | 6/1990 | Larimer et al. | |
| 5,203,275 A | 4/1993 | Brauner et al. | |
| D335,484 S | 5/1993 | Moyle et al. | |

(Continued)

*Primary Examiner* — Daniel V Venne

(74) *Attorney, Agent, or Firm* — Harness, Dickey & Pierce, P.L.C.

(57) ABSTRACT

A boat comprising a propeller tunnel formed in a hull. The tunnel has a forward end and a rearward end. The rearward end defines a shaped upper surface transverse to a longitudinal axis of the propeller tunnel. An output shaft extends from the propeller tunnel. A propeller is provided that rotates on the output shaft and comprises a plurality of blades defining: outer diameter and radius dimensions, a forward plane perpendicular to the output shaft and defined by a forward-most extension of said blades, and an aft plane perpendicular to the output shaft and defined by an aft-most extension of the blades. A protrusion is provided terminating aft of the propeller and inwardly extending from the propeller tunnel. The protrusion defines a curved portion that terminates in a tip portion, wherein a longitudinal distance between the tip portion and the aft plane is less than the outer diameter dimension.

18 Claims, 12 Drawing Sheets

(56) References Cited

U.S. PATENT DOCUMENTS

| | | |
|---|---|---|
| D378,813 S | 4/1997 | Jacques |
| 5,655,473 A * | 8/1997 | Arvilla .................. B63B 1/042 114/288 |
| 5,890,937 A | 4/1999 | Granger |
| 5,957,078 A | 9/1999 | Van Tassel |
| D416,535 S | 11/1999 | Rudofsky |
| 6,213,824 B1 | 4/2001 | Small |
| 6,851,991 B2 | 2/2005 | Eriksson |
| 7,318,388 B2 * | 1/2008 | Scism ...................... B63B 1/16 114/273 |
| 8,800,463 B2 * | 8/2014 | Sherer ..................... B63H 5/16 114/288 |

* cited by examiner

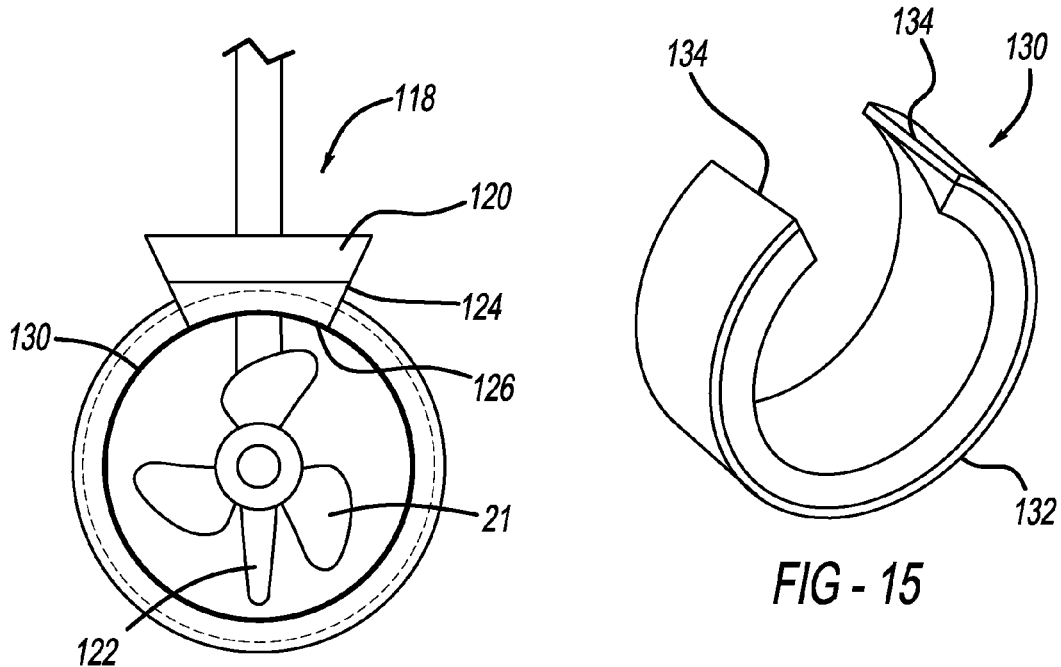
FIG - 14
FIG - 15
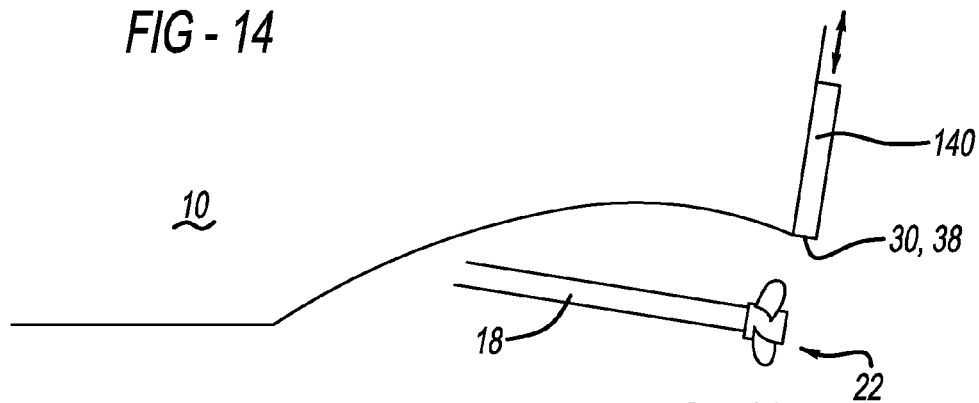
FIG - 16A
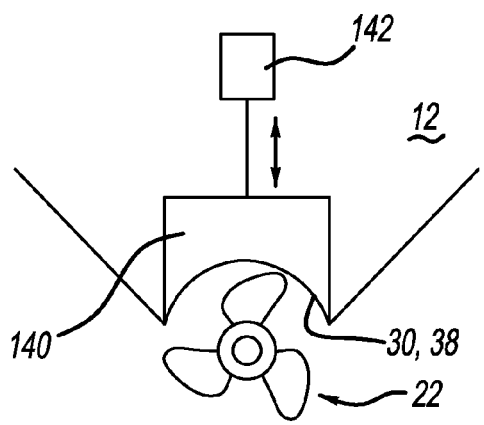
FIG - 16B

BOAT HULL CONSTRUCTION

CROSS-REFERENCE TO RELATED APPLICATIONS

This application is a continuation-in-part of U.S. application Ser. No. 13/183,888 filed on Jul. 15, 2011, which claims the benefit of U.S. Provisional Application No. 61/364,799, filed on Jul. 15, 2010. The disclosures of the above referenced applications are incorporated herein by reference in their entirety.

FIELD

The present teachings relate to a boat hull construction and more specifically relate to a structure that can be formed around a propeller that provides a propulsive force for a boat.

INTRODUCTION AND SUMMARY

The structure around a propeller of a boat can take the form of a protrusion that can extend from a propeller tunnel portion formed in a hull of an inboard engine boat or a cowling with a similar protrusion that can surround or partially surround a propeller on an outboard motor or inboard-outboard configuration.

The present teachings generally include a boat including a propeller tunnel portion formed in a hull of the boat in which a propeller rotates on an output shaft that extends from the propeller tunnel or hull. A protrusion having a curved portion terminates in a tip portion. The protrusion extends from the propeller tunnel portion and the tip portion terminates near the aft plane of the propeller.

In another aspect, the present teachings provide a boat comprising a propeller tunnel formed in a hull. The tunnel has a forward end and a rearward end. The rearward end defines a shaped upper surface transverse to a longitudinal axis of the propeller tunnel. An output shaft extends from the propeller tunnel. A propeller is provided that rotates on the output shaft and comprises a plurality of blades defining: outer diameter and radius dimensions, a forward plane perpendicular to the output shaft and defined by a forward-most extension of the blades, and an aft plane perpendicular to the output shaft and defined by an aft-most extension of the blades. A protrusion is provided terminating aft of the propeller and inwardly extending from the propeller tunnel. The protrusion defines a curved portion that terminates in a tip portion, wherein a longitudinal distance between the tip portion and the aft plane is less than the outer diameter dimension.

In yet another aspect, the present teachings provide a boat comprising a hull. A propeller tunnel may be formed in the hull. An output shaft extends from the propeller tunnel. A propeller is provided rotating on the output shaft and comprising a plurality of blades. The propeller may define an outer diameter dimension and an outer radius dimension, a forward plane perpendicular to the output shaft and defined by a forward-most extension of the blades, and an aft plane perpendicular to the output shaft and defined by an aft-most extension of the blades. The propeller tunnel portion may define a shape around and about at least a portion of the propeller, the shape being configured to conform to a contraction of a column of water as the column of water is accelerated through the propeller.

In still another aspect, the present teachings provide a boat motor comprising a propeller including a plurality of blades that rotates on an output shaft. The propeller defines an aft plane perpendicular to the output shaft and defined by an aft-most extension of the blades. An anti-ventilation plate extends at least partially around the propeller. The anti-ventilation plate comprises an inwardly extending protrusion defining an arch-shaped edge. The edge may be disposed abaft the aft plane of the propeller and extending in a plane parallel to the aft plane.

Further areas of applicability will become apparent from the description provided herein. The description and specific examples in this summary are intended for purposes of illustration only and are not intended to limit the scope of the present teachings.

DRAWINGS

The drawings described herein are for illustrative purposes only of selected aspects of the present teachings and not all possible implementations, and are not intended to limit the scope of the present teachings.

FIG. 7A is a partial cross-sectional view of the propeller and annular structure of FIG. 7 taken along the line 7A-7A.

FIG. 14 illustrates the outboard motor of FIG. 12 equipped with a propeller safety guard.

FIG. 15 illustrates an exemplary propeller safety guard that may couple to the outboard motor.

FIGS. 16A and 16B illustrate a moveable gate in accordance with the present teachings.

Corresponding reference numerals indicate corresponding parts throughout the several views of the drawings.

DETAILED DESCRIPTION

Figure 1:
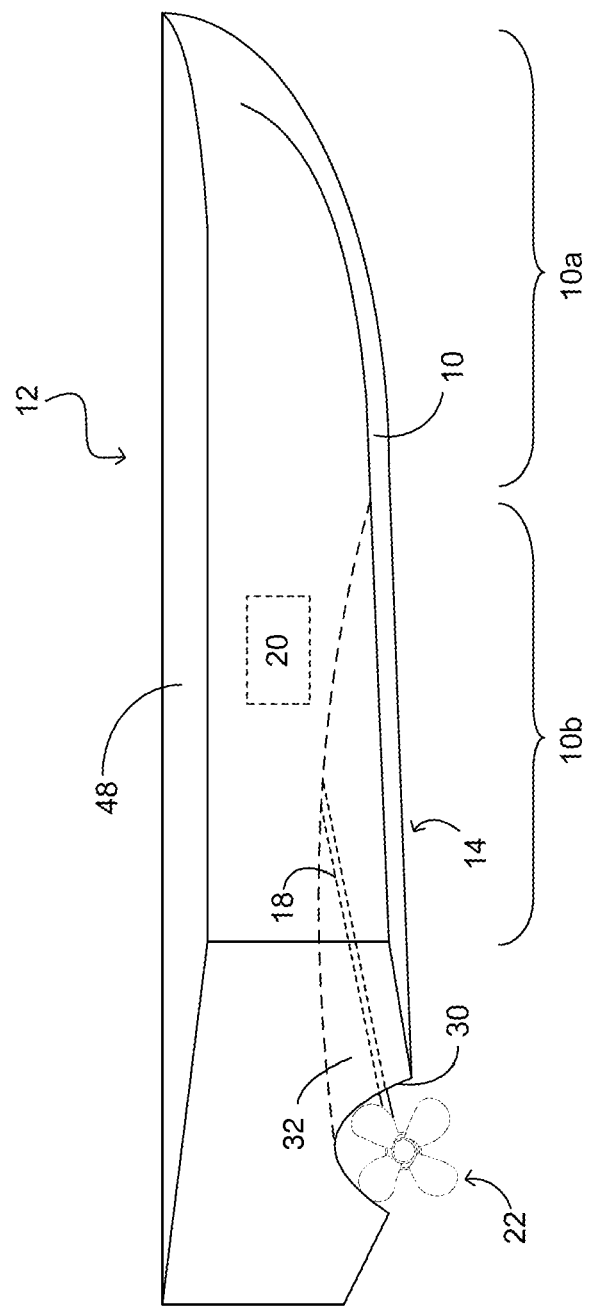
FIG. 1 is a perspective view of a hull of an exemplary boat having a propeller tunnel portion with a protrusion that is partially disposed with an aft plane of a propeller in accordance with the present teachings.

Example aspects of the teachings will now be described more fully with reference to the accompanying drawings.

Example aspects of the teachings are provided so that this disclosure will be thorough, and will fully convey the scope to those who are skilled in the art. Numerous specific details are set forth such as examples of specific components, devices, and methods, to provide a thorough understanding of the aspects of the teachings. It will be apparent to those skilled in the art that specific details need not be employed, that example aspects can be embodied in many different forms and that neither should be construed to limit the scope of the teachings. In some example aspects, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example aspects.

Spatially relative terms, such as "inner," "outer," "beneath," "below," "lower," "above," "upper," "rearward," "aft," "forward," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
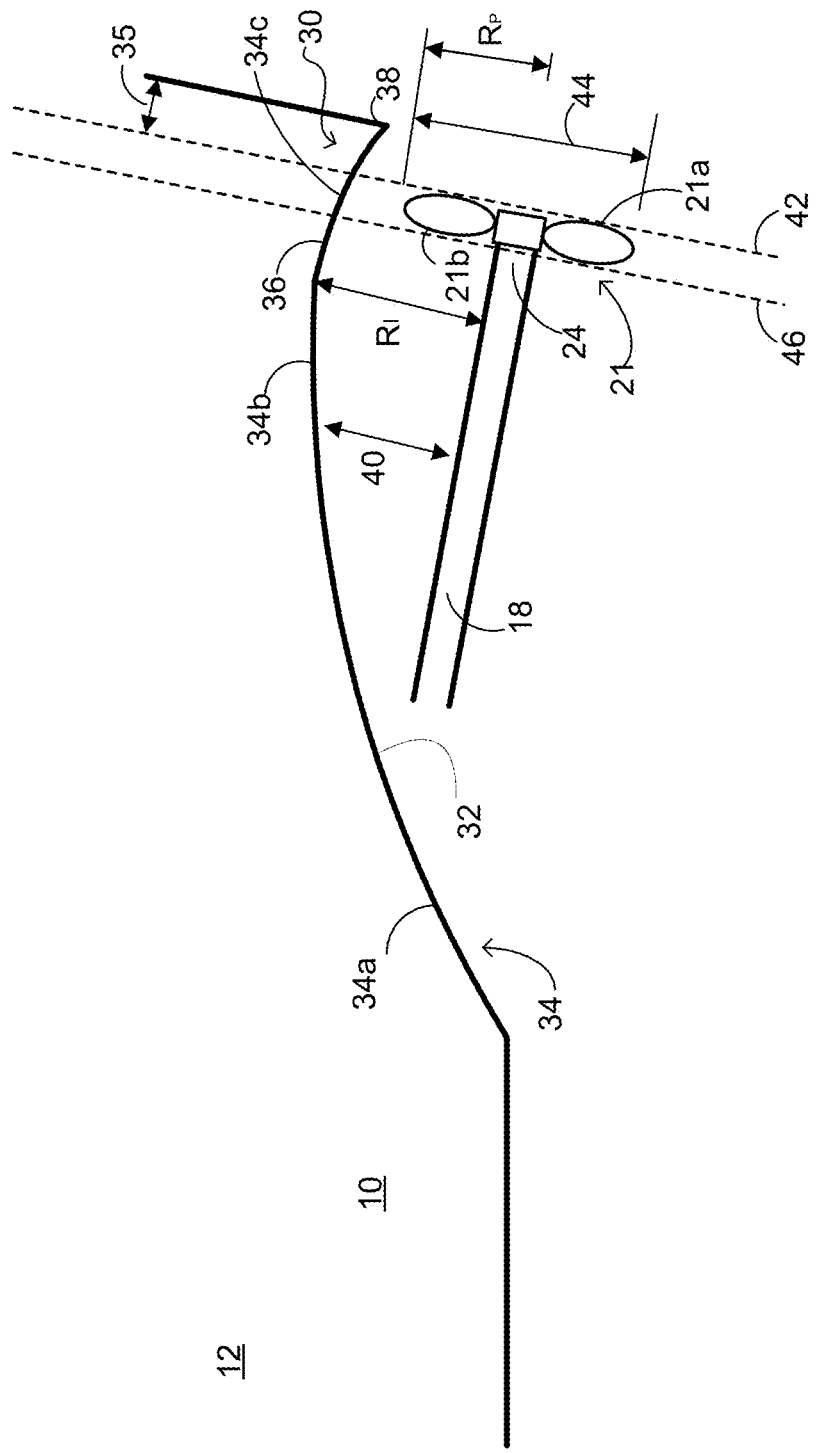
FIG. 2 is a diagram of the propeller tunnel portion showing the protrusion formed with the aft plane of the propeller in accordance with the present teachings.
Figure 3:
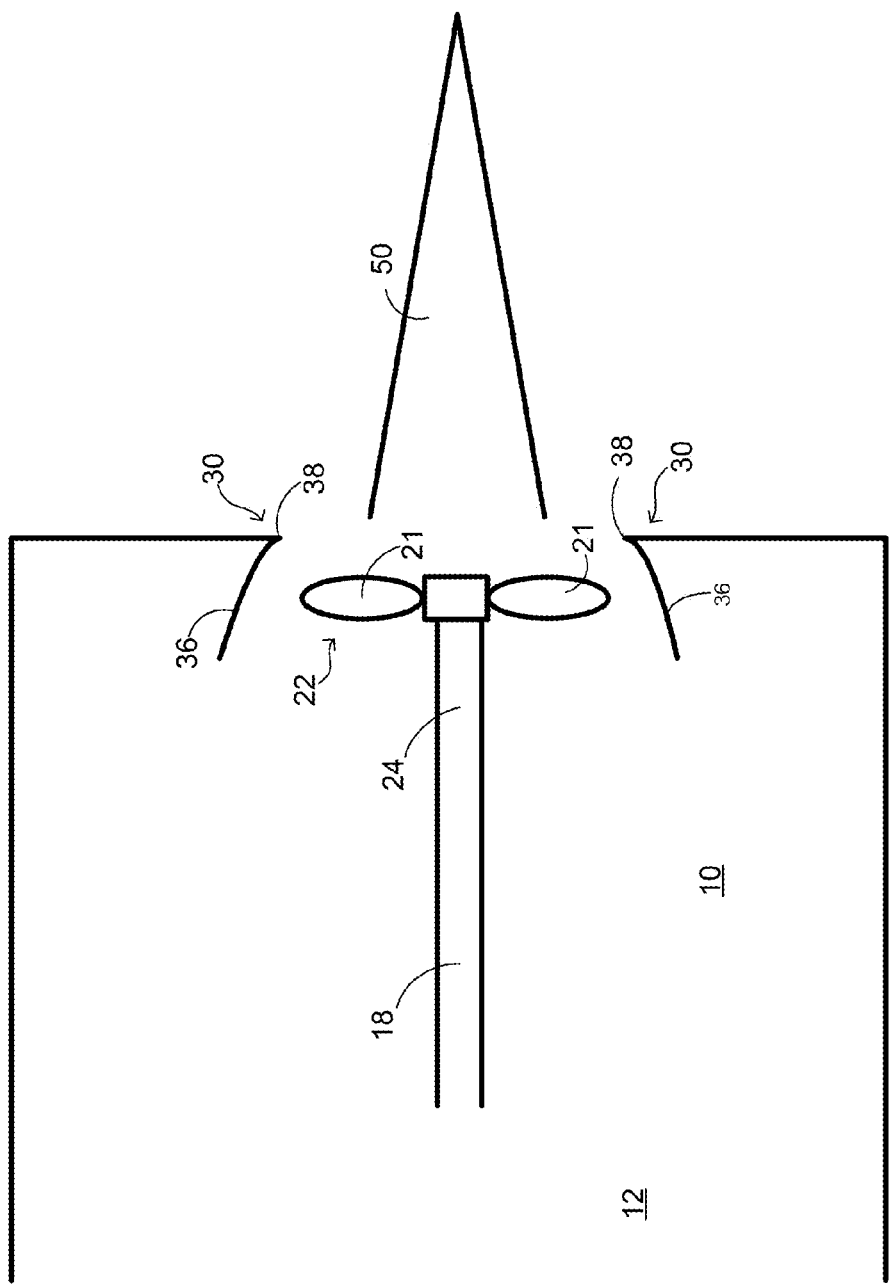
FIG. 3 is a diagram of the propeller and the protrusion showing a conical shape formed rearward of the aft plane of the propeller that may be almost entirely filled with air in accordance with the present teachings.

With reference to FIG. 1, FIG. 2, and FIG. 3, a hull 10 of a boat 12 can include a propeller tunnel portion 14. The propeller tunnel portion 14 can include a surface 16 toward the stern of the boat 12. An output shaft member 18 can extend from the surface 16 and connect to an engine 20 that can be contained within the hull 10 of the boat 12. A propeller 22 can be fixed to an end 24 of the output shaft 18 and can be rotated by the engine 20 to impart a forward velocity on the boat 12. It is envisioned that the propeller tunnel portion 14 can be formed in the hull 10 of a boat 12 during its initial manufacture, or a conventional hull can be modified and adapted as desired.

The propeller tunnel portion 14 can include a protrusion 30 formed on a surface 32. The surface 32 of the propeller tunnel portion 14 can be on the bottom of the hull 10 and adjacent a contoured portion 34 of the propeller tunnel portion 14. The protrusion 30 can have a curved portion 36 that can terminate in a tip portion 38. In various aspects, the protrusion 30 can be fixed to the surface 32, for example, as a permanent and non-movable component fixture. In other aspects, the protrusion 30 is moveable, for example, it can be movably attached to the surface 32 with known fastening means. In this regard, there may be various connection points where the protrusion 30 can be attached. In still other embodiments, the protrusion 30, as well as other features disclosed herein, may be attached to a boat having a more conventional hull, for example a hull that does not have a propeller tunnel portion.

With reference to FIG. 2, the curved portion 36 and the tip portion 38 can be configured to reduce a dimension 40 (FIG. 2) along the aft portion of the propeller tunnel portion 14 in a rearward direction between the surface of the propeller tunnel portion 14 and the axis of the propeller shaft 18. The smallest value of the dimension 40 can be found near the tip portion 38. Examples of the motivation to reduce this dimension 40 are explained below.

In one example, the curved portion 36 of the protrusion 30 inwardly extends a distance from a surface 32 of the propeller tunnel portion 14 and can terminate at the tip portion 38 that can be aligned at an aft plane 42 of the propeller 22. The aft plane 42 of the propeller 22 is a plane perpendicular to the output shaft 18 and defined by an aft-most extension 21a of the blades 21 of the propeller 22. It will be appreciated in light of the present disclosure that the tip portion 38 can be disposed with the rear plane 42 of the propeller 22 or rearward of the rear plane 42 of the propeller 22. As such, the tip portion 38 can be positioned just outside of an outer diameter 44 of the propeller 22 (i.e., outside of an outer radius—$R_P$). The propeller 22 can also have a forward plane 46. The forward plane 46 of the propeller is a plane perpendicular to the output shaft 18 and defined by a forward-most extension 21b of the blades 21 of the propeller 22.

In a further example, the tip portion 38 of the protrusion 30 can also be configured to terminate slightly rearward of the aft plane 42 of the propeller 22 and can also be positioned just inside of the outer diameter 44 of the propeller 22 ($R_P$). With respect to the radial position of the protrusion 30, the curved portion 36 can extend into the spinning outer diameter 44 of the propeller 22 and can at least appear to be similar to a partial converging nozzle or shroud around the propeller 22.

Figure 4:
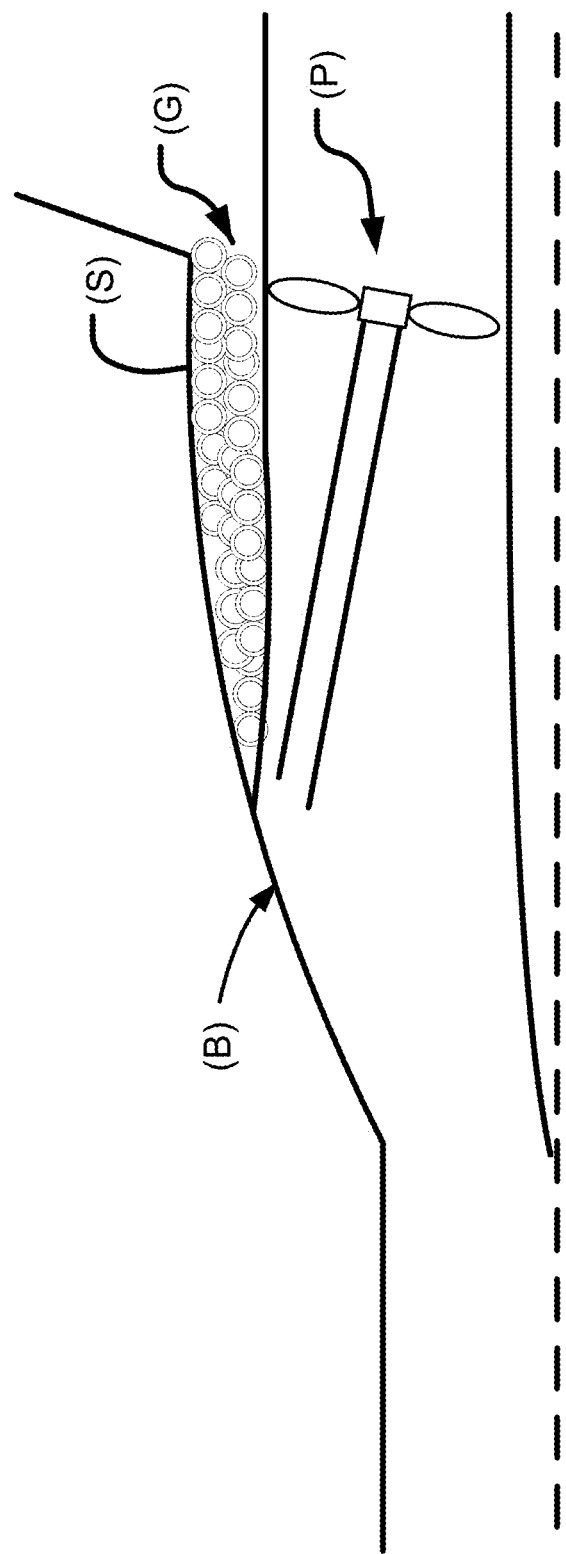
FIG. 4 is a diagram of a conventional boat hull with a propeller tunnel showing less efficient propulsion.

With reference to FIG. 4, it can be shown that as the propeller (P) draws a column of water over the propeller (P), the column of water is stretched as the propeller (P) does work on the column of water. In this regard, the column or this specific cylindrical volume of water can actually reduce in diameter as the column of water is stretched through the propeller (P). As the propeller (P) stretches the water, the diameter of the column of water travelling over the propeller (P) shrinks. Between the shrinking diameter and the flat space (S), the propeller (P) can generate eddy pools and shear forces (G) and can generate a region of low pressure between the flat space (S) and the propeller (P). The creation of the region of low pressure including the possible shear forces and eddy pools (G) can cause a reduction in propulsion efficiency due to, for example, the increased propensity for cavitation to occur.

With reference to FIGS. 1, 2, and 3, it can be shown that by reducing the dimension 40 at the propeller, increases in propulsion efficiency can be achieved. Returning to FIG. 4, the boat hull with the conventional tunnel (B) includes flat space (S) between the propeller (P) and the boat hull (B) where the propeller (P) is mounted in the propeller tunnel. Returning to FIGS. 1, 2, and 3, the protrusion 30 of the present teachings can be disposed in the propeller tunnel portion 14 to reduce the dimension 40 between the surface of the propeller tunnel portion 14 and the propeller 22 and thus generation of the low pressure region at the flat space (S) FIG. 4 is reduced or omitted.

The protrusion 30 in the propeller tunnel portion 14 can essentially curve with the shrinking diameter of the column of water over the propeller 22. The low pressure is not permitted to form. By doing so, the propeller 22 of the present teachings can more efficiently transform energy into forward motion of the boat 12.

In one example, the propeller tunnel portion 14 can have the contoured portion 34 that can serve as a gradual inflow opening. The contoured portion 34 can expand to a maximum radius i.e., (RI) about the output shaft 18 and forward of the forward plane 46 of the propeller 22. As such, the contoured portion 34 can include an inlet section 34a where the contoured area in the propeller tunnel portion 14 gradually increases (i.e., converges toward a deck 48 of the boat 12) and leads to a transition section 34b that can include the maximum radius (RI) in the propeller tunnel portion 14. The maximum radius (RI) can be related inversely to the square root of the anticipated slip by the formula below, where RP is the radius of the propeller 22 and slip is the ratio of the propeller speed of advance divided by the theoretical speed, which is given by the product of shaft rotational velocity and the pitch of the blades of the propeller 22. The radius of the propeller 22 is the distance from a center of the propeller to an outer tip of one blade 21 of the propeller 22. The radius of the propeller is half the distance as the diameter of the propeller 22.

$$R_I = \frac{R_P}{\sqrt{\text{slip}}}$$

With reference to FIG. 1, the hull 10 may be referred to as having a first portion 10a forward of a second portion 10b. A surface of the first portion 10a of the hull 10 may diverge from or may be parallel to the deck 48. A surface of the second portion 10b of the hull 10 may define the propeller tunnel portion 14 in which the propeller 22 rotates on the output shaft 18. With reference to FIG. 1 and FIG. 2, the propeller tunnel portion 14 can converge longitudinally (i.e., away from the deck 48) about the output shaft 18 of the propeller 22 and thus define a converging section 34c that can begin with approximately the maximum radius ($R_I$) at or ahead of the forward edge of the forward plane 46 of the propeller 22 and ending with approximately the radius of the propeller ($R_P$) at the rear edge of, or aft of, the propeller 22, i.e., its aft plane 42. In this regard, the propeller tunnel portion 14 can diverge away from the deck 48. In this arrangement, the discharge stream from the propeller 22 and the space in the area rearward of the aft plane 42 can be open to the surrounding atmosphere.

With reference to FIGS. 2 and 3, when the protrusion 30 is implemented with the hull 10, the propeller 22 can, in one example, produce a cone-shaped zone 50 behind the aft plane 42 of the propeller 22. The cone-shaped zone 50 can be essentially or at least partially devoid of water and extend rearward from the aft plane 42 of the propeller 22. By being devoid of water, the cone-shaped zone can be filled with air. The cone-shaped zone 50 behind the propeller 22 can come into formation when the boat 12 is at (or is approaching) cruise speed. Even in this arrangement, the entire front plane 46 of the propeller 22 can be fully covered by water.

Figure 5:
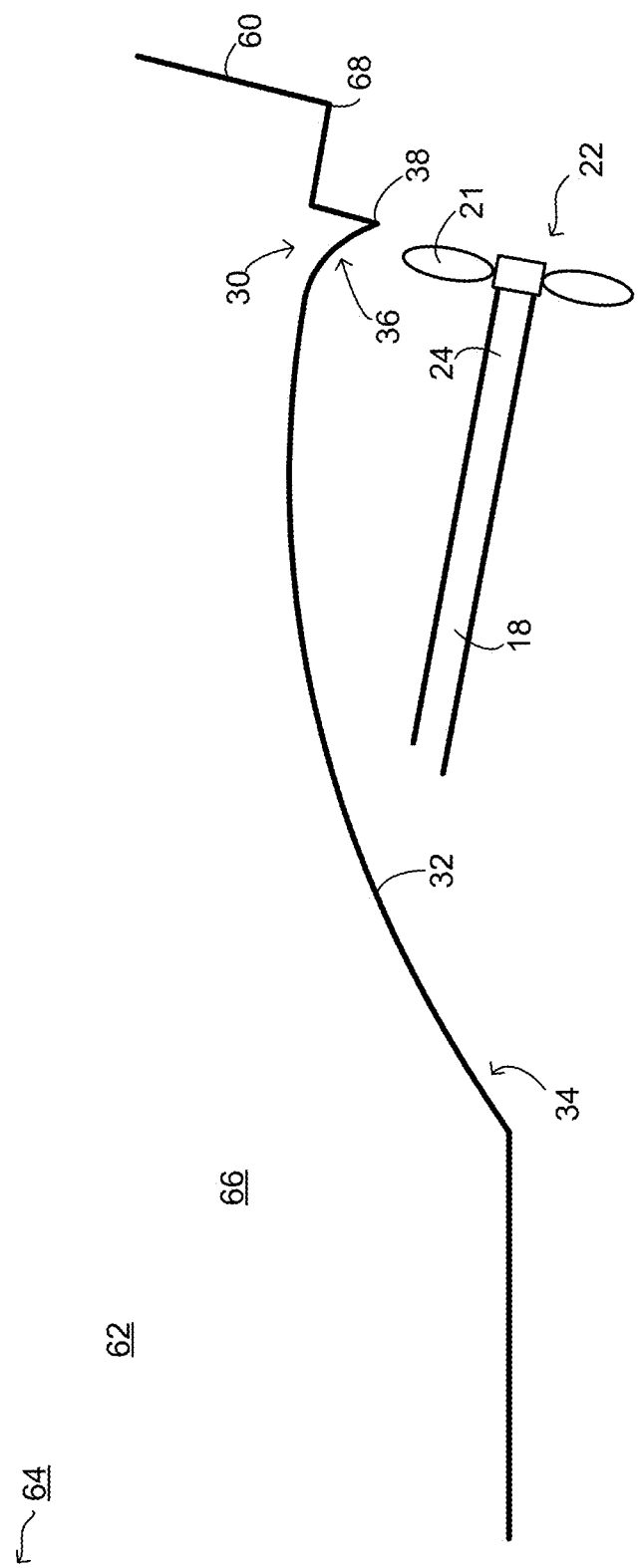
FIG. 5 is a diagram of an alternative boat hull having a protrusion that is formed with the aft plane of the propeller in accordance with the present teachings.

In an additional example and with reference to FIG. 5, the propeller 22 can be positioned inward from a stern 60 of a boat 62 in contrast to what is illustrated in FIG. 1. Even though the propeller 22 can be shifted toward a bow 64 of the boat 62, (i.e., moved forward), the protrusion 30 can also be shifted toward the bow 64 of the boat 62 so that the tip portion 38 can be positioned with the aft plane 42 (FIG. 2) of the propeller 22. In this example, a hull 66 of the boat 62 could be configured to direct an airflow 68 toward the aft plane 42 and in the region behind the propeller 22 to further increase efficiency of this arrangement. The source of the airflow 68 could be solely from ducting airflow from forward motion of the boat 62 or could be from a compressed or atmospheric pressure air source resident on the boat 62. Another source for the airflow 68 can be ducted exhaust from the engine 20 (FIG. 1).

Figure 6:
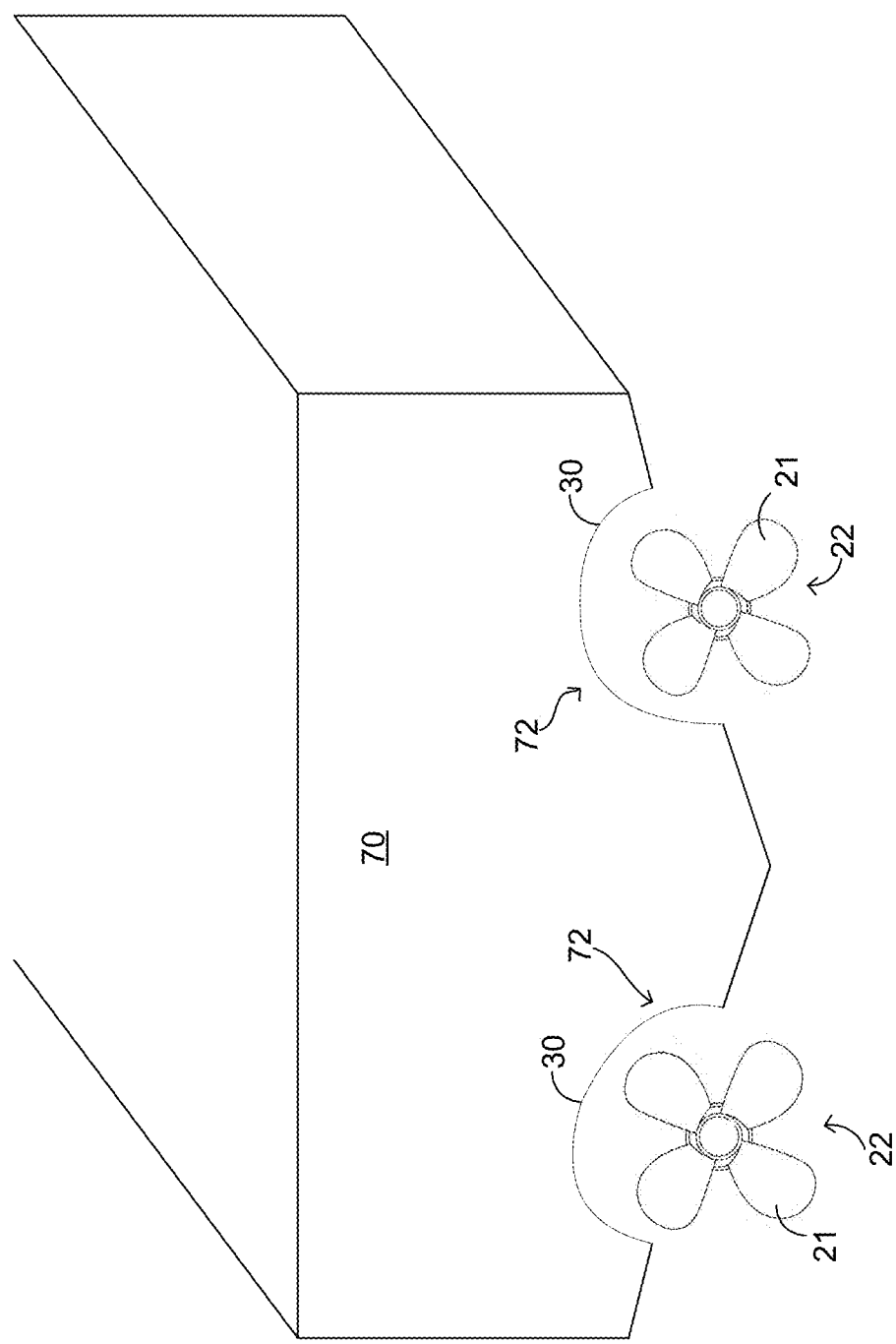
FIG. 6 is a partial perspective view of a hull of a boat having two propellers and protrusions formed in propeller tunnels of each of the propellers in accordance with the present teachings.
Figure 7:
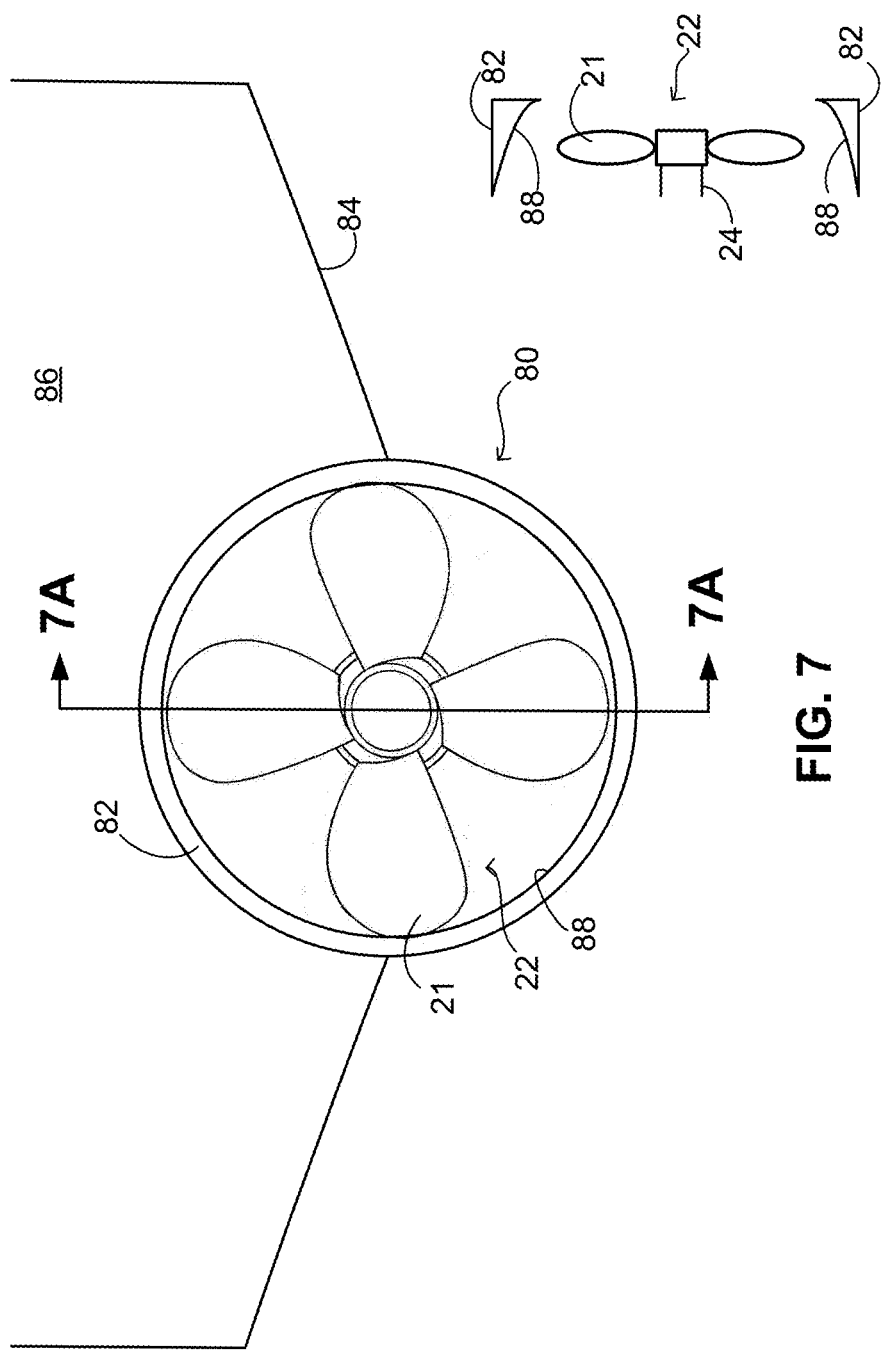
FIG. 7 is a diagram of a hull of a boat having a protrusion that is implemented in a fully annular structure in accordance with the present teachings.

In another example and with reference to FIG. 6, the protrusion 30 as discussed above can be implemented with multiple propellers 22 on a boat 70 having multiple propeller tunnels 72. In yet another example, the protrusion 30, as shown in FIG. 2, can be implemented in a fully annular ring 80, as shown in FIG. 7, and FIG. 7A (a partial cross-sectional view of FIG. 7), such that the protrusion 30 can be formed to provide a cowl all of the way around the propeller 22 to form a 360° structure 82 that can surround the propeller 22. The structure 82 can also partially extend from a bottom 84 of the boat 86. The structure 82 can also partially form an annular structure and therefore be less than 360°. The curved portion 36 and a tip portion 38 can be formed in the same way, but in the fully annular structure. The 360° structure 82 can have an inner annular edge 88 that can have a minimum inner diameter. The inner annular edge 88 can be similarly disposed at or rearward of the aft plane 42 (FIG. 2) of the propeller 22.

It is appreciated in light of the disclosure that the annular structure 82 or a segment thereof can be implemented on an outboard (or inboard/outboard or pod) so that the inner annular edge 88 that can be similarly disposed at or rearward of the aft plane 42 of the propeller 22. In this example, air or exhaust gas may be supplied behind the aft plane 42 of the propeller 22, as is discussed further herein.

Figure 8:
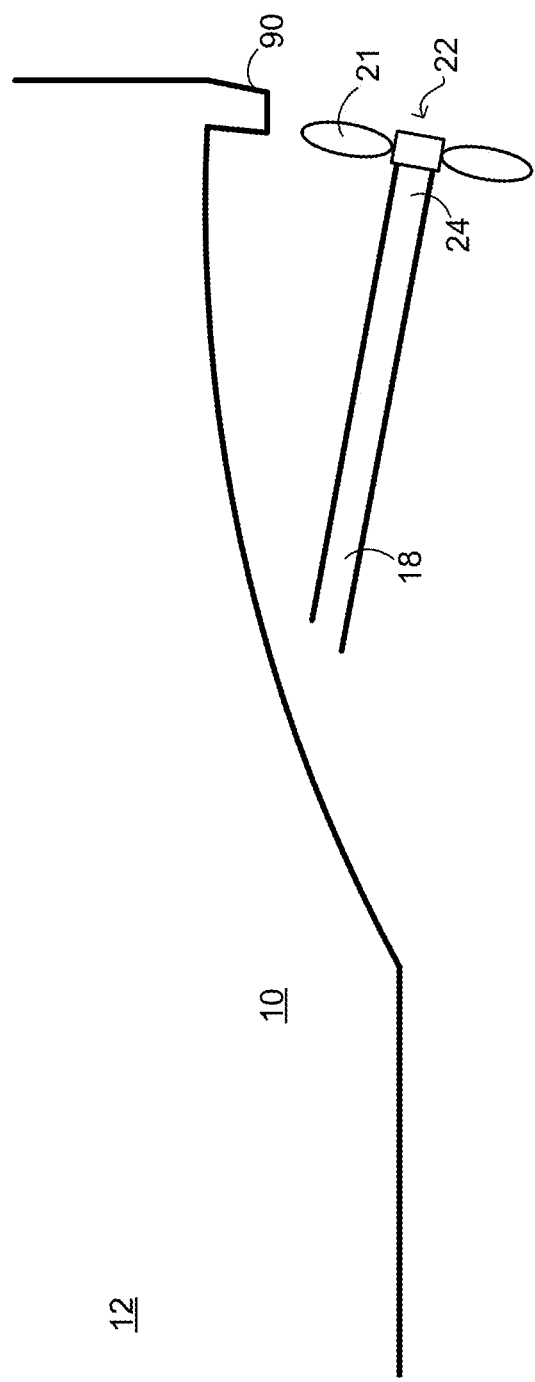
FIG. 8 is a diagram of a hull of a boat having a rectangular protrusion formed with the aft plane of the propeller in accordance with the present teachings.

In another example and with reference to FIG. 8, a rectangular portion 90 can be implemented in the same position as the curved portion 36 and the tip portion 38 of the protrusion 32 that extends from the propeller tunnel portion 14, as shown in FIG. 2.

Figure 9:
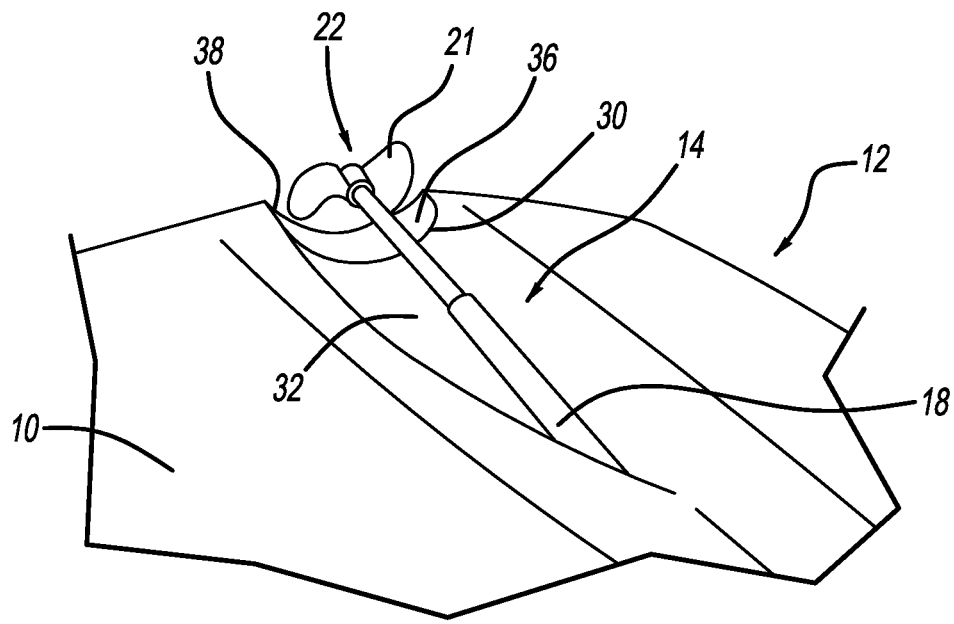
FIG. 9 is a partial perspective view of the hull of a boat having the protrusion as shown in FIG. 2.

FIG. 9 is a partial perspective view of the hull 10 of a boat 12 having the protrusion 30 as shown in FIG. 2. In various aspects, the longitudinal distance 35 (shown in FIG. 2) between the tip portion 38 and the aft plane 42 is less than the outer diameter dimension 44 of the propeller. In various other aspects, the longitudinal distance 35 between the tip portion 38 and the aft plane 42 may be less than the outer radius dimension $R_P$ of the propeller. In this regard, a rearward area or converging area 34C of propeller tunnel 14 is able to define a shape around and about at least a portion of the propeller that is configured to conform, direct, or otherwise contour a contraction of a column of water as the column of water is accelerated through or past the propeller 22. In other words, the shaped surface 32 of the propeller tunnel 14 is able to cooperate with the protrusion 30 and tip portion 38 in order to direct the flow of water such that it follows the hull and minimizes any generation of regions of low or negative pressure between the flat space (S) and the propeller (P) as shown in FIG. 4 and discussed above. This may effectively reduce any displacement of the boat and may alter the hydrodynamic effect. For example, it may mitigate the downward effect of any reduced pressure otherwise caused by the contraction of a water stream through the propeller.

Figure 10:
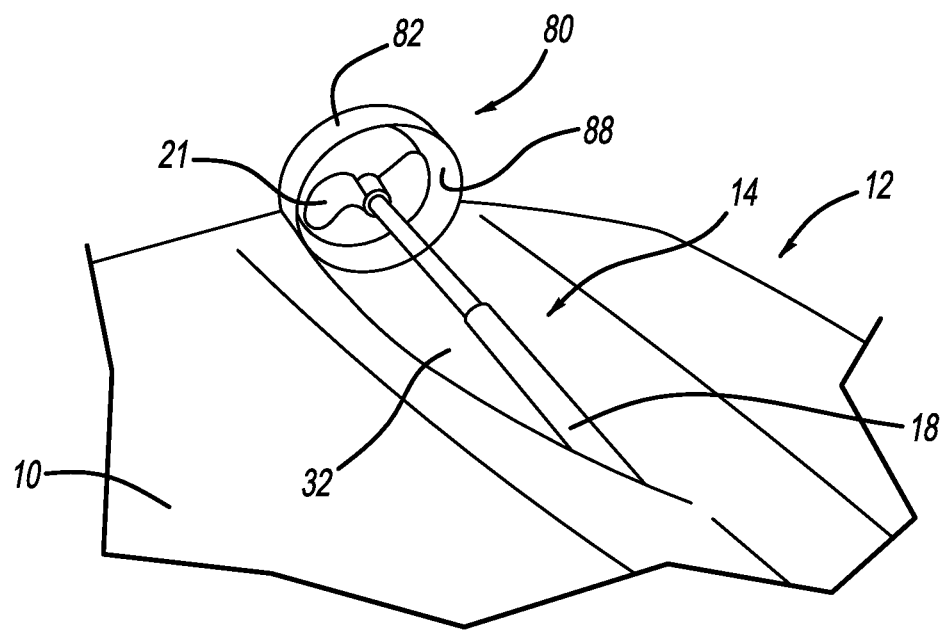
FIG. 10 is a partial perspective view of the hull of a boat having the annular structure as shown in FIG. 7.

FIG. 10 is a similar partial perspective view of the hull of a boat as shown in FIG. 9, and illustrates the hull having the annular structure 80 defining an inner annular edge 88 as shown in FIG. 7. With reference to both FIGS. 9 and 10, it may be preferred to design the tunnel portion 14 to effectively be shaped or curved similar to a funnel. While a circular cross-section or partial cross-section may provide desired and consistent results, it should be understood that the shape of the propeller tunnel 14 may be any shape that is consistent with an effective radius $R_f$ that satisfies the slip formula described above, or accommodates a similar general volume relationship. By way of example, the propeller tunnel shape may be modified to accommodate space constraints within the hull. Thus in certain areas, it may be flattened and widened to compensate and preserve the inlet volume. It may be oval in shape, have various curves, or even partially rectangular in shape, in whole or in part.

Figure 11:
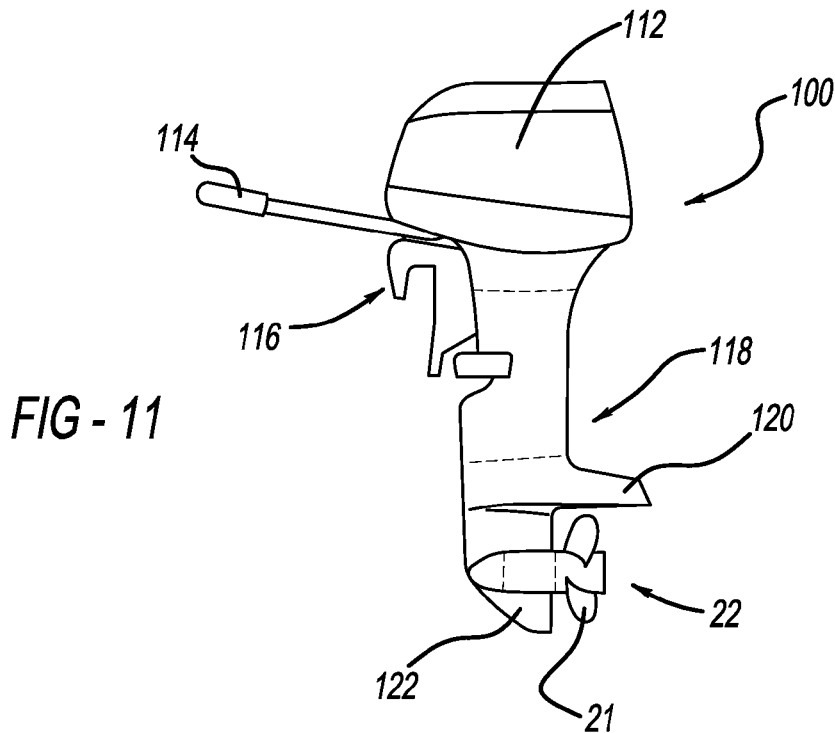
FIG. 11 is a side plan view of an exemplary outboard motor.
Figure 12:
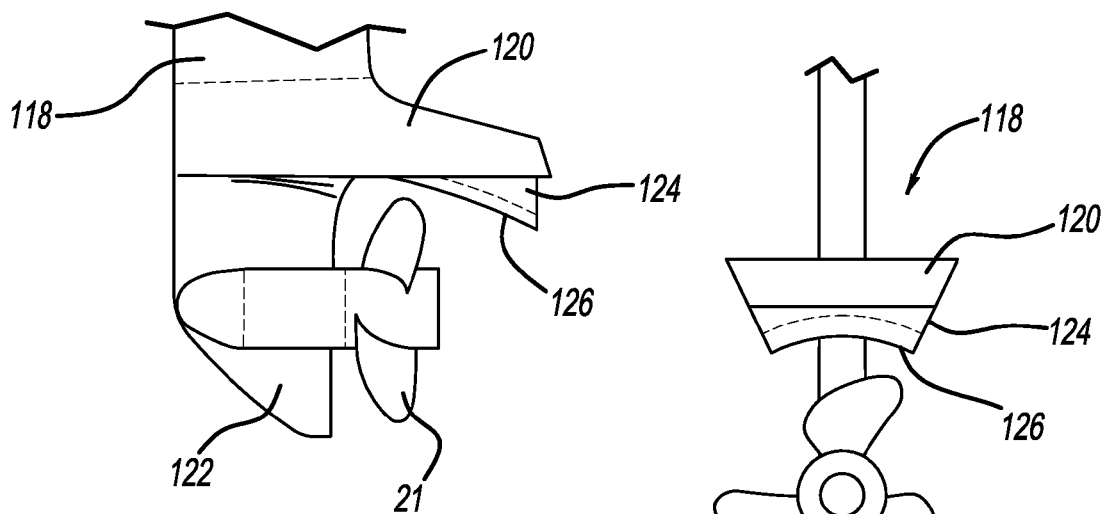
FIG. 12 is a magnified partial side plan view of the lower half of an outboard motor in accordance with the present teachings.
Figure 13:
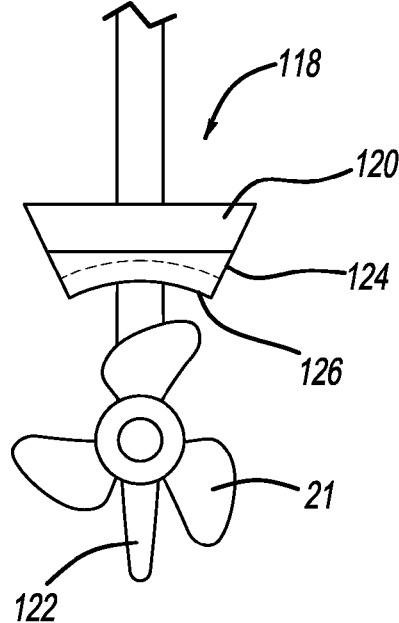
FIG. 13 is a rear plan view of FIG. 12.

FIGS. 11-15 illustrate an outboard motor according to the teachings of the present disclosure. It should be understood that while shown as an outboard motor, the teachings are equally applicable for use with a stern drive, a pod drive, or the like. FIG. 11 is a side plan view of an exemplary outboard motor 100 that may include a body 112 housing the motor, a handle 114, a mount 116, and a skeg 122 as are generally known in the art. FIG. 12 is a magnified partial side plan view of the lower portion of an outboard motor in accordance with the present teachings; FIG. 13 is a rear plan view of FIG. 12. The lower case 118 may include an anti-ventilation plate 120, also known as an anti-cavitation plate, that extends at least partially around the propeller 22. According to the present teachings, the anti-ventilation plate 120 may be provided with an underside having a curved partial funnel shape such as an inwardly extending protrusion 124 that may define a curved or an arch-shaped edge 126 disposed a distance abaft of the propeller. The protrusion 124 of the anti-ventilation plate 120 may be similar in shape, design, and function as the protrusion 30 of the boat hull discussed above. As shown, the edge 126 may extend from side to side of the plate 120 in a plane perpendicular to the aft plane 42 of the propeller.

FIG. 14 illustrates the outboard motor of FIG. 12 equipped with a propeller safety guard 130 surrounding the blades. As is known in the art, in certain instances where a propeller safety guard is used, there may be a loss in efficiency of the motor. It is envisioned that with the use of the anti-ventilation plate 120 including the extending annular protrusion 124, the loss of efficiency may be minimized or eliminated.

FIG. 15 illustrates one non-limiting example of a propeller safety guard 130 that may be coupled to the outboard motor 100. The guard 130 may include a substantially annular body 132 with two end regions 134 configured for coupling to the anti-ventilation plate 124 by known mechanical or adhesive fastening means. In other aspects, the guard 130 may be a completely annular member or a cage, as may be desired.

Figure 17:
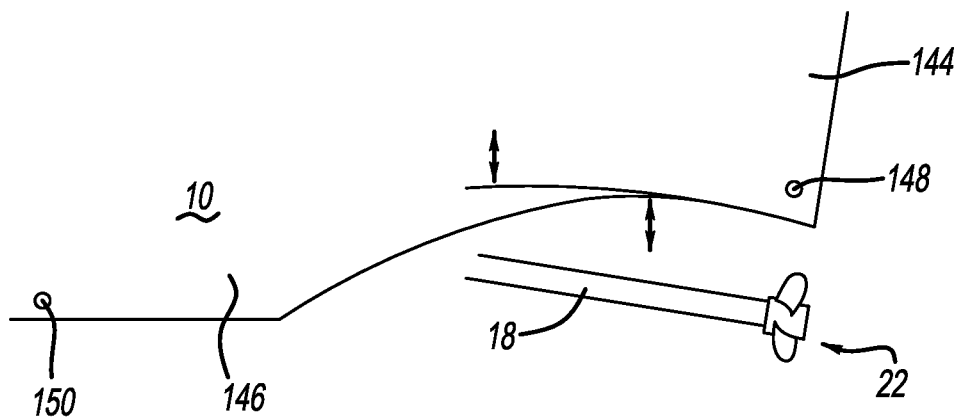
FIG. 17 illustrates a hull with interlocking plates in accordance with the present teachings.
Figure 18:
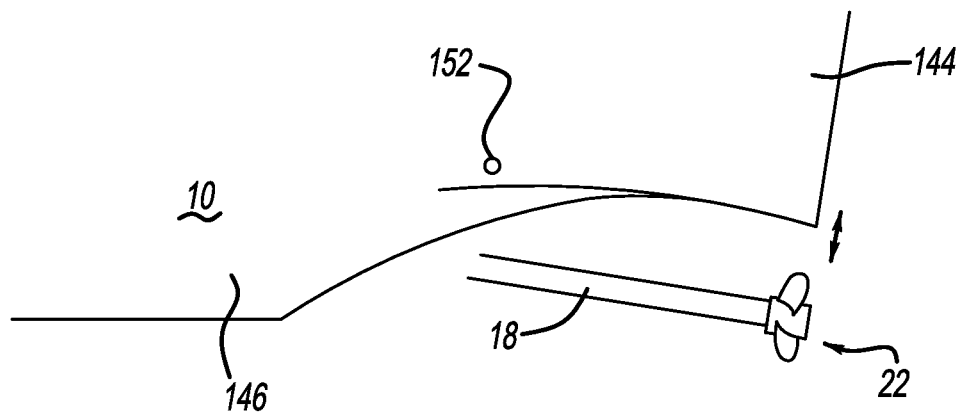
FIG. 18 illustrates a hull with a pivoting aft portion in accordance with the present teachings.

FIGS. 16-18 illustrate various adjustments that may be made to the shape of the hull 10 by using a protrusion that is movable with respect to the propeller tunnel. In certain circumstances, the resistance of a hull moving through the water may change based on varying conditions. For example, boat velocity, loading or displacement, trim, hull fouling, and weather conditions may all play a role in hull resistance, which in turn may affect the desired shape and size of the protrusion to be used with the present teachings.

FIGS. 16A and 16B illustrate a side and rear plan view, respectively, of a moveable gate 140 in accordance with the present teachings. As shown, the moveable gate 140 includes and may define at least a portion of the tip 38 of the protrusion 30, and is configured to move up and down in a plane substantially perpendicular to the longitudinal axis of the propeller output shaft 18. In various aspects, actuation of the moveable gate 140 could be through a piston 142, arm, hydraulic ram, or the like, and could be actuated by mechanical and/or electrical means.

FIG. 17 illustrates a hull with interlocking plates in accordance with the present teachings. As shown, the hull may be provided with a plurality of interlocking sections or plates 144, 146 that may be pivotally or rotatably attached to the hull at respective rearward and forward pivot points 148, 150. The interlocking sections or plates 144, 146 may be independently attached to the hull at the respective rearward and forward pivot points 148, 150 such that the interlocking sections or plates 144, 146 may be moved or adjusted independently relative to the hull. For example, in FIG. 17, the interlocking section or plate 144 may be secured at rearward pivot point 148 and the interlocking section or plate 146 may be secured at forward pivot point 150. Interlocking section 144 may be rotated in a clockwise or counterclockwise direction around pivot point 148 as illustrated by the arrows in FIG. 17. Interlocking section 146 may be rotated in in a clockwise or counterclockwise direction around pivot point 150 as illustrated by the arrows in FIG. 17. The plates 144, 146 may function similar to the operation of a camera aperture in that the pivoting or rotational movement of the plates may change the surface shape 32 of the propeller tunnel 14, for example, raising/lowering the tunnel ceiling and the location of the protrusion 30. For example, when interlocking section or plate 144 is rotated clockwise around pivot point 148 and interlocking section or plate 146 is rotated counterclockwise around pivot point 150, the tunnel ceiling is raised. When interlocking section or plate 144 is rotated counterclockwise around pivot point 148 and interlocking section or plate 146 is rotated clockwise around pivot point 150, the tunnel ceiling is lowered. FIG. 18 is similar in design to FIG. 17, but illustrates a hull with only a pivoting aft portion 144 with a different axis of rotation 152, while the forward section 146 may remain stationary. For example, in FIG. 18, the interlocking section or plate 144 may be secured at pivot point 152. Interlocking section 144 may be rotated in a clockwise or counterclockwise direction around pivot point 152 as illustrated by the arrows in FIG. 18. The pivoting or rotational movement of the interlocking section or plate 144 may change the surface shape 32 of the propeller tunnel 14, for example, raising/lowering the tunnel ceiling and the location of the protrusion 30. For example, as the interlocking section 144 is rotated clockwise, the tunnel ceiling is lowered and the protrusion 30 is lowered. When the interlocking section 144 is rotated counterclockwise, the tunnel ceiling is raised and the protrusion 30 is raised. Similar to the actuation of the movable gate, actuation of the tunnel portions 144, 146 could also be through a piston, arm, hydraulic ram, or the like, and could be actuated by mechanical and/or electrical means. Further examples of sections being constructed to be moveable or pivotable so that they can move inward or outward and also modify the tunnel cross-section can be found in U.S. Pat. No. 7,318,388, incorporated by reference herein in its entirety.

The foregoing description of the aspects of the present teachings has been provided for purposes of illustration and description. It is not intended to be exhaustive or to limit the teachings. Individual elements or features of a particular aspect are generally not limited to that particular aspect, but, where applicable, are interchangeable and can be used in selected examples, even if not specifically shown or described. The same may also be varied in many ways. Such variations are not to be regarded as a departure from the teachings, and all such modifications are intended to be included within the scope of the present teachings.

What is claimed is:

1. A boat comprising:
  a propeller tunnel formed in a hull of the boat, said propeller tunnel having a forward end and a rearward end, said rearward end defining a shaped upper surface extending transverse to a longitudinal axis of said propeller tunnel;
  an output shaft that extends from said propeller tunnel;
  a propeller rotating on said output shaft and comprising a plurality of blades, said propeller defining: an outer diameter dimension and an outer radius dimension, a forward plane perpendicular to said output shaft and defined by a forward-most extension of said blades, and an aft plane perpendicular to said output shaft and defined by an aft-most extension of said blades; and
  a protrusion terminating aft of said propeller and inwardly extending from said propeller tunnel, said protrusion defining a curved portion that terminates in a tip portion, wherein a longitudinal distance between said tip portion and said aft plane is less than said outer diameter dimension.

2. The boat of claim 1, wherein said longitudinal distance between said tip portion and said aft plane is less than said outer radius dimension.

3. The boat of claim 1, wherein said shaped upper surface of said propeller tunnel is configured to direct and shape a column of water as said column of water is accelerated through said propeller such that the shaped upper surface of said propeller tunnel allows said column of water to follow the hull and minimize any generation of eddy pools and shear forces within or around said column of water.

4. The boat of claim 3, wherein said shaped upper surface comprises an arched surface.

5. The boat of claim 4, wherein said arched surface defines a substantially circular shape.

6. The boat of claim 1, wherein said protrusion is coupled to at least one of said propeller tunnel and said hull.

7. The boat of claim 1, wherein said protrusion is movable with respect to said propeller tunnel.

8. The boat of claim 7, further comprising a gate movable in a direction substantially perpendicular to a longitudinal axis of said output shaft, said gate defining at least a portion of said protrusion.

9. The boat of claim 7, wherein said hull comprises at least two interlocking plates pivotably connected to said hull and defining a shape of said propeller tunnel.

10. The boat of claim 1, wherein said curved portion of said protrusion defines a surface that longitudinally becomes closer to said output shaft.

11. The boat of claim 1, wherein said protrusion extends from said hull of the boat as a complete annular structure forming a cowl around said propeller.

12. The boat of claim 1, wherein said propeller tunnel defines a contoured portion configured to serve as an inflow opening, wherein said contoured portion defines a maximum radius ($R_I$) according to the formula, $$R_I = \frac{R_P}{\sqrt{\text{slip}}}$$

where ($R_P$) is said outer radius dimension of said propeller, and (slip) is a ratio of the propeller speed of advance divided by the product of a shaft rotational velocity and a pitch of said propeller.

13. A boat comprising:
  a hull;
  a propeller tunnel formed in said hull;
  an output shaft that extends from said propeller tunnel; and
  a propeller rotating on said output shaft and comprising a plurality of blades, said propeller defining: an outer diameter of said propeller and an outer radius of said propeller from a center of the propeller to an outer tip of one blade, a forward plane perpendicular to said output shaft and defined by a forward-most extension of said blades, and an aft plane perpendicular to said output shaft and defined by an aft-most extension of said blades, wherein
  said outer radius of said propeller is half of said outer diameter of said propeller,
  a rearward area of said propeller tunnel defines a shape around and about at least a portion of said propeller, said shape being configured to direct and shape a column of water as said column of water is accelerated through said propeller, such that said rearward area of said propeller tunnel allows said column of water to follow said hull and minimize any generation of eddy pools and shear forces within or around said column of water,
  said propeller tunnel defines a contoured portion, a transition section, a curved portion and a tip portion, said curved portion and said tip portion defining a protrusion extending inward from said propeller tunnel toward said propeller, and a longitudinal distance dimension between said tip portion of said propeller tunnel and said aft plane of said propeller is less than said outer diameter of said propeller to increase propulsion efficiency and reduce or omit generation of a low pressure region, eddy pools, and shear forces between said hull and said propeller or said output shaft.

14. The boat of claim 13, wherein said protrusion terminates at or aft of said aft plane of said propeller.

15. The boat of claim 13, wherein said longitudinal distance between said tip portion and said aft plane is less than said outer radius of said propeller.

16. The boat of claim 13, wherein said protrusion is movable with respect to said propeller tunnel.

17. The boat of claim 13, wherein said propeller tunnel defines a contoured portion configured to serve as an inflow opening, wherein said contoured portion defines or approximates a maximum radius ($R_I$) according to the formula, $$R_I = \frac{R_P}{\sqrt{\text{slip}}}$$

where ($R_P$) is said outer radius of said propeller, and (slip) is a ratio of the propeller speed of advance divided by the product of a shaft rotational velocity and a pitch of said propeller.

18. The boat of claim 17, wherein said product of said shaft rotational velocity and said pitch of said propeller is reduced by a loss in propulsion efficiency.

* * * * *